May 4, 1965
J. KOZINSKI
3,182,237
HIGH VOLTAGE MULTI-UNIT ASSEMBLY HAVING READILY
REPLACEABLE UNITS
Filed May 8, 1962
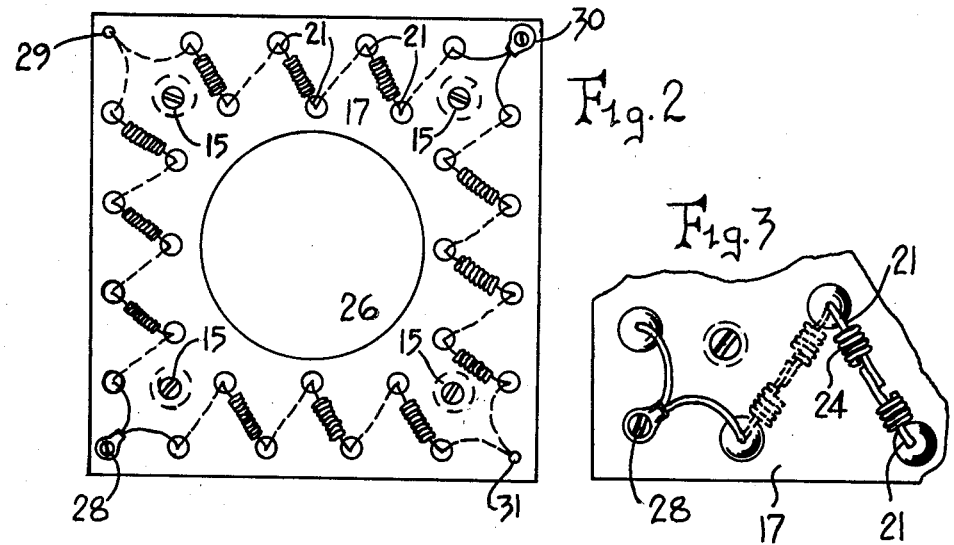
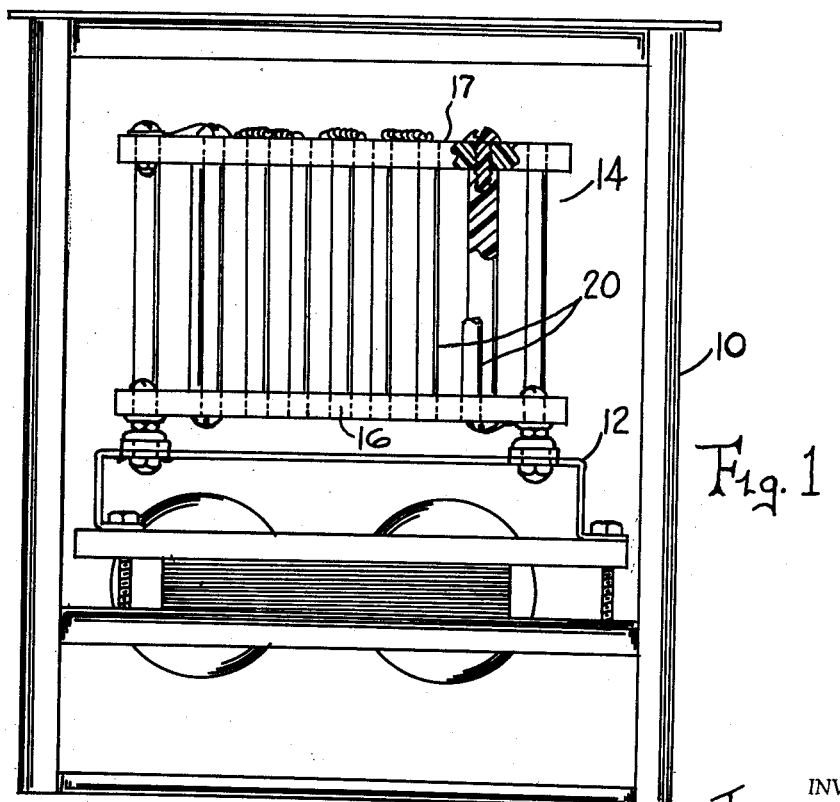
INVENTOR.
JOSEPH KOZINSKI
BY
Robert L. Kahn

United States Patent Office 3,182,237
Patented May 4, 1965

3,182,237
HIGH VOLTAGE MULTI-UNIT ASSEMBLY HAVING READILY REPLACEABLE UNITS
Joseph Kozinski, Chicago, Ill., assignor to H. G. Fischer & Co., Inc., Franklin Park, Ill., a corporation of Illinois
Filed May 8, 1962, Ser. No. 193,230
3 Claims. (Cl. 317—234)

This invention relates to a high voltage assembly, and more particularly to a high voltage assembly of electrically connected rectifiers. The assembly forming the subject matter of the present application has particular use in connection with power supplies used in X-ray equipment, electrostatic coating systems and other applications where potentials of the order of 100,000 to 200,000 volts at low current are used. Power supplies of this character generally provide electric currents in the low milliampere range. As an example, the current used by an electrostatic coating system will rarely be in excess of a few milliamperes.

It has been customary in such power supplies to use electron discharge type of rectifiers wherein the full potential is impressed across the terminals of a rectifier. As a rule, such rectifiers are of the high vacuum type and quite costly. There are now available solid state rectifiers using silicon, for example, wherein each unit can withstand reverse potential of the order of about 18,000 volts. Such rectifiers have certain advantages over the high vacuum electron discharge type in regard to cost, no warm-up time and long life. One disadvantage to which such solid state rectifiers are subject is the necessity for connecting the requisite number of rectifier units in series to withstand the potential on reverse cycle. For example, in the case of an 18,000 volt rectifier, it is necessary to connect at least ten rectifiers in series to withstand a back potential of 180,000 volts. In fact, to have a margin of safety, it would be desirable to connect about twelve rectifiers in series in such a system and not subject each rectifier to more than about 15,000 volts back potential.

A series connected rectifier system of this character subjects the individual rectifier units to severe operating conditions which may be due in some measure to the distribution of the high reverse potential among the individual series connected rectifier units. At any rate, such rectifier units fail and must be replaced.

The present invention is concerned with a convenient mounting of a group of rectifier units and convenient means for connecting or disconnecting such units. For a full understanding of this invention, reference will now be made to the drawings wherein:

FIGURE 1 is an elevation of a power supply housing containing among other things, an assembly of rectifiers properly connected to function.

FIGURE 2 is a top plan view of the rectifier assembly embodying the present invention.

FIGURE 3 is an enlarged view illustrating the convenient connecting means for two rectifier units.

A power supply for an X-ray tube system or an electrostatic coating system can be disposed in a housing, generally indicated by 10, consisting of a steel framework with panels of glass or other electrically insulating material. As a rule, the housing provides a sealed compartment containing a quantity of transformer oil or similar liquid insulator. Within the housing there will be disposed a step-up transformer for changing 115 or 230 volts to 100,000 volts or whatever voltage is desired. In addition, resistors and capacitors may be provided as desired. A power supply of this general type is more fully disclosed in my prior Patents Nos. 2,782,358, issued February 19, 1957, and 2,935,548, issued May 3, 1960. These patents illustrate power supplies using high vacuum electron discharge types of rectifiers. The power supply disposed in housing 10 here may incorporate as many of the features of the power supplies in my prior patents consistent with the elimination of the electron discharge type of rectifiers and the substitution thereof by the rectifier assembly to be described. Insofar as the electrical characteristics and details of the rectifier system are concerned, it is understood that a power supply embodying the present invention may be of the half wave or full wave type, and if of the latter type, it may be of the bridge variety disclosed in FIGURE 3 of my earliest patent referred to above.

A rectifier assembly embodying the present invention is supported within housing 10 by suitable cross members 12 of steel or of insulating material upon which rectifier assembly 14 may be bolted at 15 in a number of places. Assembly 14 consists of a pair of spaced parallel plates 16 and 17 of electrically insulating material having a high dielectric strength. As an example, the plastic sold under the name "Lucite" and consisting of methyl methacrylate can be used. Other plastics or glass may be used. Preferably, insulating plates 16 and 17 are free of any substantial tendency to absorb water and will have the characteristic of maintaining its high dielectric qualities for long periods of time even though immersed in an insulating liquid. Insulating plates 16 and 17 are mechanically strong enough to support the weight of the rectifier elements. Insofar as the mechanical strength of the plates is concerned, the loading is comparatively light so that the strength of material is not an important factor.

Slidably disposed in registering apertures in plates 16 and 17 are rod-shaped rectifier elements 20. These rectifier elements are available on the market and as one example, may have a diameter of about one-half inch and a length of about a foot. Each rectifier rod in this particular instance is rated at about 18,000 volts and is provided with wire leads 21 at the ends thereof. Leads 21 may consist of tinned copper wire of approximately No. 16 or No. 18 gauge and have a length of the order of about two or three inches. Because of the light weight of each rectifier unit 20, they may be loosely disposed in registering holes in insulating plates 16 and 17 and under normal conditions would drop through both plates. However, and in accordance with the present invention, a simple and convenient means for supporting and inter-connecting adjacent rectifier units is provided. Referring for example to FIGURE 2, it will be noted that the rectifier units are disposed in a zigzag pattern about the center portion of plates 16 and 17. Leads 21 of two adjacent rectifier units are extended toward each other as illustrated in FIGURE 3 and disposed within the turns of coil spring 24. Coil spring 24 is preferably of metal and may consist of copper, brass, iron or steel. Metal is preferred for the reason that the contact between parts of wire leads 21 and the spring will function to provide a good electrical connection. Because of the high voltage and low current, the resistance of the joints is not important within wide limits. Coil spring 24 is preferably long enough to extend for most of the distance between the adjacent ends of a pair of connected rectifier units. The leads are threaded into a spring from opposite ends.

It will be understood that the pattern of connections between rectifier units will provide for the desired overall arrangement of rectifier units. It is also understood that the coil spring connection beween the leads of two adjacent rectifier units will be provided both above top plate 17 and below bottom plate 16. The stiffening action of the coil springs on the leads will suffice to retain the respective rectifier units against dropping downwardly. In the event that a rectifier unit fails, it may be removed very easily by dismantling the coil spring connections at the two ends of the defective rectifier unit and replacing the same with a new unit. The new unit may be connected very easily in proper place. It is understood that the housing if sealed will have to be opened to gain access to the bank of rectifier units. If desired, the rectifier assembly may be mounted in a more accessible location.

Insulating plates 16 and 17 preferably have their central portions cut out at 26 to provide a through passage along the entire assembly. This will promote the passage of insulating liquid or air, as the case may be, for the purpose of dissipating any heat and will also render access to the individual rectifier units more convenient.

While the rectifier units have been illustrated as being mounted in a vertical position, it is clear that the assembly may be mounted in any other position. The particular pattern in which the individual rectifier units are arranged may also be varied to suit requirements.

As illustrated in FIGURE 2, the rectifier units are connected to four terminals, 28 to 31 inclusive. These may be simple screw terminals in the corners of top plate 17 to which the appropriate rectifier unit leads may be connected. Insofar as these terminal leads are concerned, they will be pulled tightly enough to keep the appropriate rectifier units in position. As a rule, these terminals will be at the top plate so that there will be no strain on these leads.

It is possible to have the bottom aperture of each pair of registering apertures smaller than the rod-shaped rectifier element so that only the bottom rectifier lead can be threaded through. This would necessitate removal of a defective rectifier by endwise movement through the top plate. In such case, the rectifier element would rest against the inside face of bottom plate 16. It is also possible to have the apertures in both plates just large enough to accommodate the wire terminal leads and have the rectifier ends opposite the inside faces of both plates. In such cases, a defective rectifier would have to be removed by lateral movement and sufficient clearance for pulling out the wire leads would have to be provided.

What is claimed is:

1. In a high voltage, low current assembly, the combination of a pair of flat insulating plates, means for maintaining said plates in spaced, parallel, laterally offset relation, said plates having registering apertures therethrough, a plurality of rod-shaped circuit components disposed in laterally offset parallel relation, each component having its ends registering with apertures in said insulating plates, each component having terminal lead wires extending from opposite ends thereof with such lead wires extending at the outer faces of said insulating plates, said components being retained against lateral movement by said insulating plates, each terminal lead wire being long enough to overlap the terminal lead wire of an adjacent component so that a number of such components can be connected in series and metallic helical springs disposed over the over-lapping ends of terminal lead wires to maintain the series connections of said components, each spring accommodating a pair of overlapping terminal lead wires extending into the coils of a spring from opposite ends thereof, said springs and lead wires permitting ready replacement of a defective component.

2. The construction according to claim 1 wherein at least one insulating plate has the apertures large enough to permit withdrawing a damaged component endwise.

3. The construction according to claim 2 wherein said high voltage assembly is a power supply for electrostatic coating systems and said components are rectifiers.

References Cited by the Examiner
UNITED STATES PATENTS

| | | | |
|---|---|---|---|
| 2,423,091 | 7/47 | Fiore et al. | 317—234 |
| 2,562,048 | 7/51 | Lamm et al. | 317—234 |
| 2,596,237 | 5/52 | Gross et al. | 317—234 |
| 2,750,540 | 6/56 | Waldkotter et al. | 317—241 |
| 2,945,200 | 7/60 | Tarbuck | 339—17 |

FOREIGN PATENTS

| | | |
|---|---|---|
| 159,232 | 10/54 | Australia. |
| 195,499 | 2/08 | Germany. |

DAVID J. GALVIN, *Primary Examiner.*
JAMES D. KALLAM, *Examiner.*